US012737684B2

(12) United States Patent
Goldsteen et al.

(10) Patent No.: US 12,737,684 B2
(45) Date of Patent: Sep. 15, 2026

(54) MODEL-SPECIFIC SYNTHETIC DATA GENERATION FOR MACHINE LEARNING MODEL TRAINING

(71) Applicant: International Business Machines Corporation, Armonk, NY (US)

(72) Inventors: Abigail Goldsteen, Haifa (IL); Ron Shmelkin, Givatayim (IL); Ariel Farkash, Shimshit (IL); Maya Anderson, Netanya (IL)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 18/203,076

(22) Filed: May 30, 2023

(65) Prior Publication Data

US 2024/0403690 A1 Dec. 5, 2024

(51) Int. Cl.
*G06N 20/00* (2019.01)

(52) U.S. Cl.
CPC .................................... *G06N 20/00* (2019.01)

(58) Field of Classification Search
CPC ...... G06N 20/00; G06F 18/213; G06F 18/214
See application file for complete search history.

(56) References Cited

U.S. PATENT DOCUMENTS

2022/0164346 A1 5/2022 Mitra

OTHER PUBLICATIONS

Vietri, Giuseppe, et al. "Private synthetic data for multitask learning and marginal queries." Advances in Neural Information Processing Systems 35 (2022): 18282-18295. (Year: 2022).*
Mireshghallah, Fatemehsadat, et al. "Not all features are equal: Discovering essential features for preserving prediction privacy." Proceedings of the Web Conference 2021. 2021. (Year: 2021).*
Amnon Catav et al., "Marginal Contribution Feature Importance—an Axiomatic Approach for Explaining Data"; Proceedings of the 38th International Conference on Machine Learning, vol. 139, pp. 1324-1335, Jul. 18-24, 2021.
Efstathia Soufleri et al., "Synthetic Dataset Generation for Privacy-Preserving Machine Learning"; Online at: https://arxiv.org/abs/2210.03205, Oct. 6, 2022.
Giuseppe Vietri et al., "New Oracle-Efficient Algorithms for Private Synthetic Data Release"; Online at: http://proceedings.mlr.press/v119/vietri20b/vietri20b.pdf, Jul. 10, 2020.
(Continued)

*Primary Examiner* — Eric Nilsson
(74) *Attorney, Agent, or Firm* — Anthony Curro

(57) ABSTRACT

A computer-implemented method including: receiving a trained machine learning model; extracting a set of features associated with the machine learning model, wherein each of the extracted features is assigned a feature importance score which represents a relative explanatory power of the feature with respect to an output of the machine learning model; generating a set of marginal queries based, at least in part, on a selected subset of the features having a highest the feature importance score; performing a measurement of the set of marginal queries on a source database, to obtain measurements of the set of marginal queries on the source database; and using the measurements to generate synthetic data that matches the measurements.

19 Claims, 4 Drawing Sheets

(56) References Cited

OTHER PUBLICATIONS

Giuseppe Vietri et al., "Private Synthetic Data for Multitask Learning and Marginal Queries"; Online at: https://arxiv.org/pdf/2209.07400.pdf, Sep. 15, 2022.
Hadi Keivan Ekbatani et al., "Synthetic Data Generation for Deep Learning in Counting Pedestrians"; 6th International Conference on Pattern Recognition Applications and Methods; Jan. 2017.
Nazmiye ceren Abay et al., "Privacy Preserving Synthetic Data Release Using Deep Learning"; Joint European Conference on Machine Learning and Knowledge Discovery in Databases, Dec. 2018.
Ossi Raisa et al., "Noise-Aware Statistical Inference with Differentially Private Synthetic Data"; Online at: https://arxiv.org/pdf/2205.14485.pdf, Feb. 24, 2023.
Ryan McKenna et al., "AIM: An Adaptive and Iterative Mechanism for Differentially Private Synthetic Data"; Online at: https://arxiv.org/pdf/2201.12677.pdf, Jan. 29, 2022.
Sergul Aydore et al., "Differentially Private Query Release Through Adaptive Projection"; Online at: https://arxiv.org/pdf/2103.06641.pdf, Jun. 23, 2021.
Shashank Tripathi et al., "Learning to Generate Synthetic Data via Compositing"; Online at: https://arxiv.org/pdf/1904.05475.pdf, Jul. 8, 2019.
Terrance Liu et al., "Iterative Methods for Private Synthetic Data: Unifying Framework and New Methods"; Online at: https://arxiv.org/pdf/2106.07153.pdf, Dec. 9, 2021.
Datta et al., "Algorithmic Transparency via Quantitative Input Influence: Theory and Experiments with Learning Systems", 2016 IEEE Symposium on Security and Privacy, May 22-26, 2016, 20 pages, https://ieeexplore.ieee.org/document/7546525.
Patel et al., "Model Explanations with Differential Privacy", FAccT '22: 2022 ACM Conference on Fairness, Accountability, and Transparency, Jun. 21, 2022, 11 pages, https://dl.acm.org/doi/fullHtml/10.1145/3531146.3533235.

* cited by examiner

CLIENT COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

SYNTHETIC DATA GENERATOR 300

FEATURE SCORING MODULE 302

QUERY GENERATION MODULE 304

PRIVATIZER MODULE 306

MACHINE LEARNING MODULE 308

PERIPHERAL DEVICE SET 114

UI DEVICE SET 123

STORAGE 124

IoT SENSOR SET 125

NETWORK MODULE 115

END USER DEVICE 103

WAN 102

REMOTE SERVER 104

REMOTE DATABASE 130

PRIVATE CLOUD 106

GATEWAY 140

PUBLIC CLOUD 105

CLOUD ORCHESTRATION MODULE 141

HOT PHYSICAL MACHINE SET 142

VIRTUAL MACHINE SET 143

CONTAINER SET 144

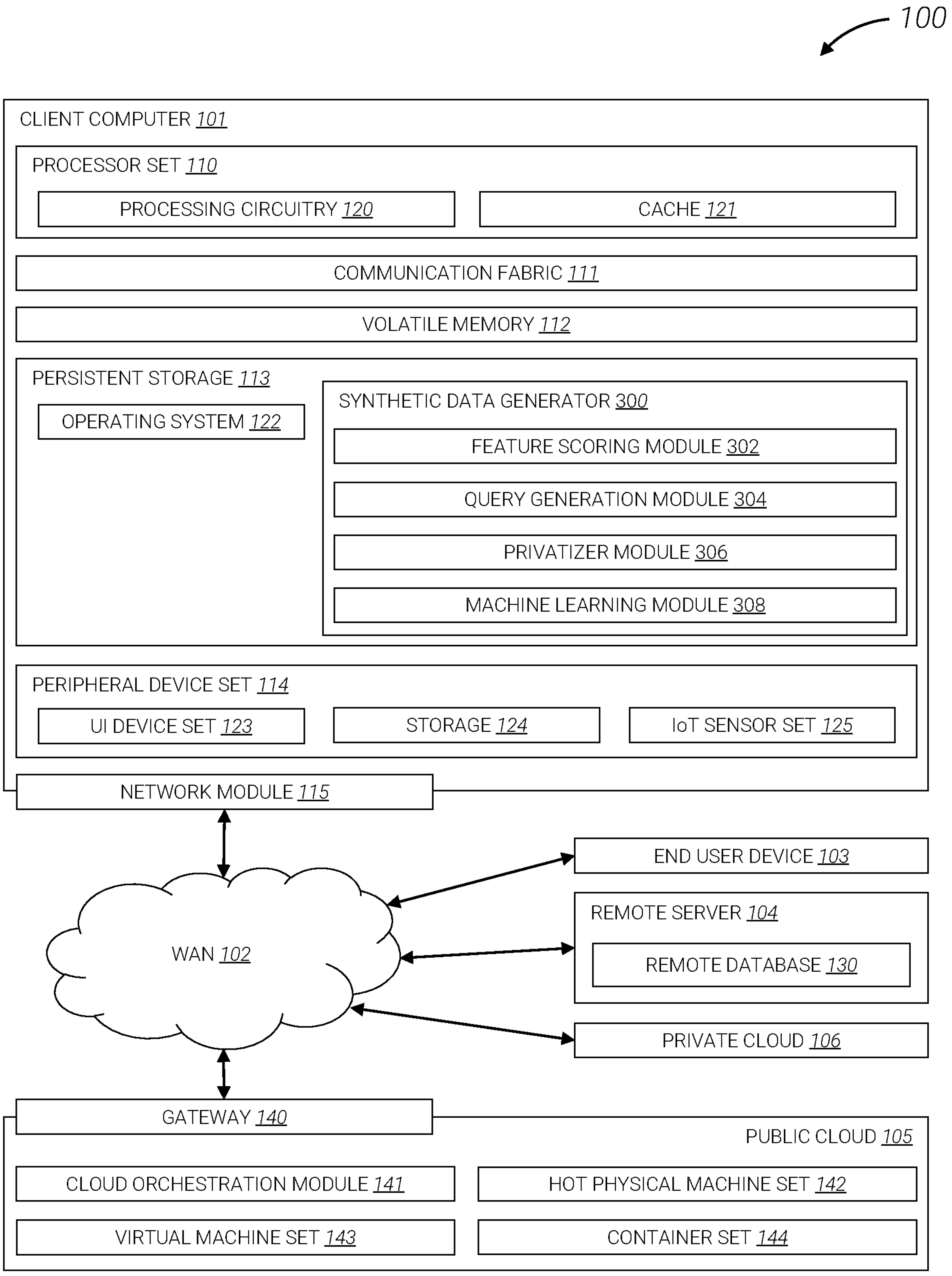

FIGURE 1

MODEL-SPECIFIC SYNTHETIC DATA GENERATION FOR MACHINE LEARNING MODEL TRAINING

BACKGROUND

The invention relates to the field of machine learning and artificial intelligence.

Gathering and analyzing information about people is becoming increasingly important. Many fields of technology rely on data mining techniques, including machine learning, statistics, and database systems. These techniques can be used to discern meaningful patterns in the data, produce a classification or regression model that can make predictions about the future, or detect anomalies in the data.

The data used for training machine learning models and similar algorithms is often sensitive, and may come from multiple sources with different privacy requirements. In some of these cases, government mandates specific privacy protections through laws and regulation. In other cases, businesses may want to encourage customers to provide more personal data by promising to protect their privacy. These privacy considerations necessitate that the original data be modified in some way, or that the output of data mining algorithms be modified, while retaining sufficient utility in the information that can be discovered from the data.

Synthetic data generation is one possible solution to this challenge. Synthetic data is information that is not generated by real-world occurrences, but is rather artificially generated using computer algorithms. Synthetic data can thus be used to train and validate machine learning models, without any privacy or other constraints associated with regulated or sensitive data. In addition, synthetic data can be created per specific requirements, which cannot always be achieved when using real-world data, as well as for data augmentation purposes.

Data-driven approaches to synthetic data generation pose the challenge of ensuring that the synthetic data does not disclose any of the private information in the underlying dataset, while retaining sufficient utility for machine learning training or validation tasks.

One generative approach is the statistical query-based mechanism, which selects a set of k-way marginal queries to evaluate over the original dataset. In some cases, privacy constraints may be applied, to ensure that the resulting data complies with privacy requirements. A k-way marginal query of a database D may be defined as a ratio of records in D with a specified value in each of a given set of up to k columns. Once a set of marginal queries has been determined, the marginal queries are evaluated over the data. In order to preserve privacy, a small amount of noise can be added to each value in the marginal query results, to satisfy privacy concerns. Once the marginal query values are determined, an algorithm is used to search for a synthetic dataset that best satisfies the marginal query values. Thus, marginal queries enable rich statistical analyses of dataset while reducing privacy concerns.

However, these methods pose a scalability issue when large numbers of features are concerned, because the number of marginal queries can grow exponentially. When selecting a marginal query, the higher the k, the more statistically accurate the resulting synthetic data, however, this incurs an exponential computational overhead, as well as significantly increasing the amount of noise that needs to be added to the results to satisfy privacy constraints. Especially when dealing with high-dimensional data, any k larger than 2 can be computationally impractical.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a computer-implemented method comprising: receiving a trained machine learning model; extracting a set of features associated with the machine learning model, wherein each of the extracted features is assigned a feature importance score which represents a relative explanatory power of the feature with respect to an output of the machine learning model; generating a set of marginal queries based, at least in part, on a selected subset of the features having a highest the feature importance score; performing a measurement of the set of marginal queries on a source database, to obtain measurements of the set of marginal queries on the source database; and using the measurements to generate synthetic data that matches the measurements.

Another embodiment relates to a system comprising at least one hardware processor; and a non-transitory computer-readable storage medium having program code embodied therewith, the program code executable by the at least one hardware processor to: receive a trained machine learning model, extract a set of features associated with the machine learning model, wherein each of the extracted features is assigned a feature importance score which represents a relative explanatory power of the feature with respect to an output of the machine learning model, generate a set of marginal queries based, at least in part, on a selected subset of the features having a highest the feature importance score, perform a measurement of the set of marginal queries on a source database, to obtain measurements of the set of marginal queries on the source database, and use the measurements to generate synthetic data that matches the measurements.

A further embodiment relates to a computer program product comprising a non-transitory computer-readable storage medium having program code embodied therewith, the program code executable by at least one hardware processor to: receive a trained machine learning model; extract a set of features associated with the machine learning model, wherein each of the extracted features is assigned a feature importance score which represents a relative explanatory power of the feature with respect to an output of the machine learning model; generate a set of marginal queries based, at least in part, on a selected subset of the features having a highest the feature importance score; perform a measurement of the set of marginal queries on a source database, to obtain measurements of the set of marginal queries on the source database; and use the measurements to generate synthetic data that matches the measurements.

In some embodiments, the method further comprises using, and the program code is further executable to use, the synthetic data to construct a training dataset, wherein the training dataset is used to re-train the received trained machine learning model.

In some embodiments, the source database comprises private data, and wherein the measurement is a privacy-preserving measurement of the set of marginal queries on the source database comprising the private data, to obtain privacy-preserving measurements of the set of marginal queries on the source database.

In some embodiments, the privacy-preserving measurement is a differentially-private measurement.

In some embodiments, the trained machine learning model is initially-trained on private data, and wherein the extracting and the assigning are performed using a privacy-preserving feature importance extraction method.

In some embodiments, the privacy-preserving feature importance extraction method is a differentially-private feature importance extraction method.

In some embodiments, the feature importance scores comprise at least one of the following categories: global feature importance scores, and local feature importance scores.

In some embodiments, the assigning further comprises assigning, to at least some of the features, at least one of the following measures: covariance, and sensitivity.

In some embodiments, the selected subset of features comprises k features, and wherein the set of marginal queries comprises all k-way marginal queries which include the selected subset of k features.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 1 is a block diagram of an exemplary computing environment, containing an example of an environment for the execution of at least some of the computer code involved in performing the inventive methods, according to an embodiment.

DETAILED DESCRIPTION

Figure 2A:
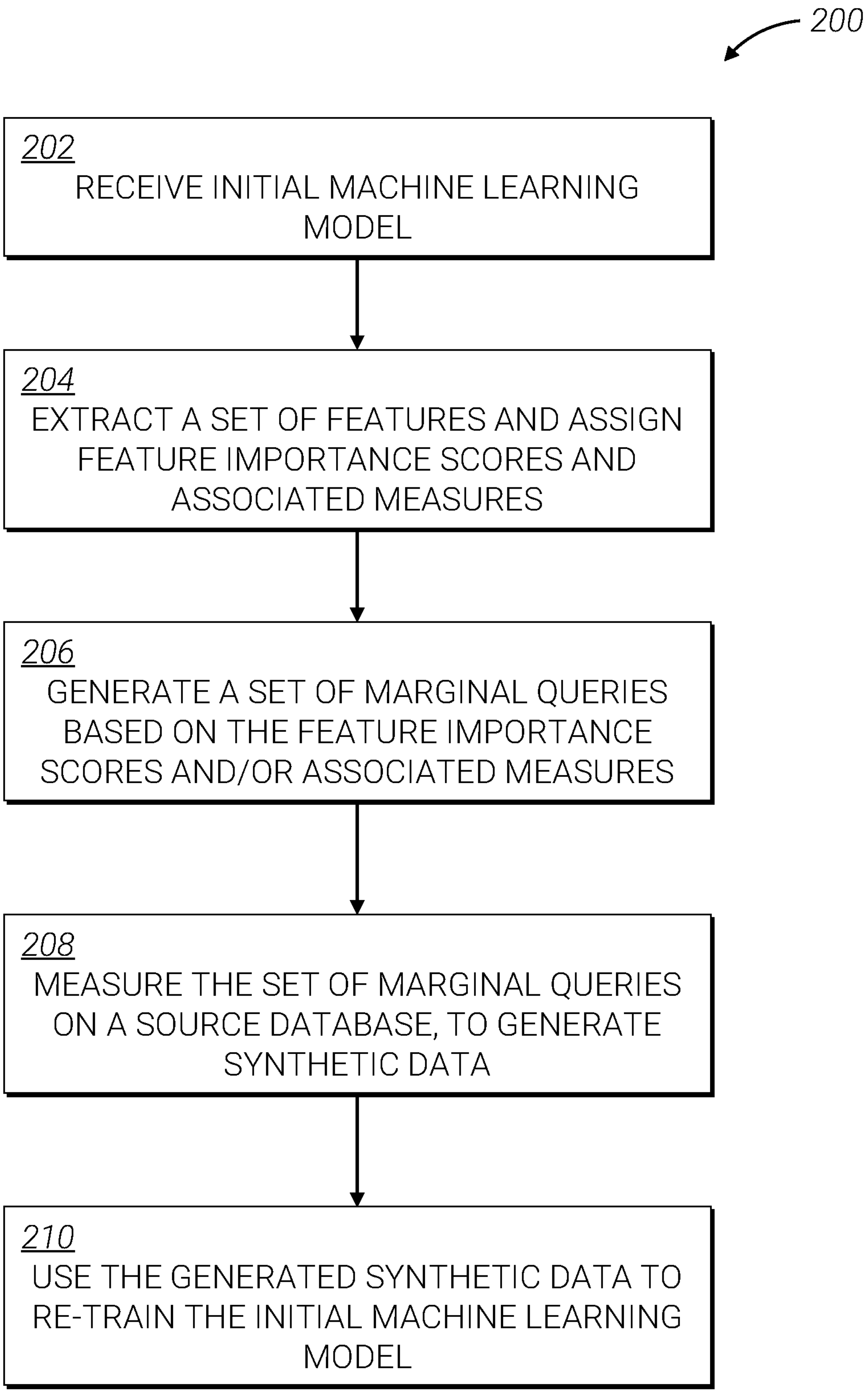
FIG. 2A is a flowchart of a method for model-specific synthetic data generation from a source database, in accordance with an embodiment.

Disclosed herein is a technique, embodied as a computer-implemented method, a system, and a computer program product, which provides for model-specific synthetic data generation from underlying data. In some embodiments, the present technique provides for privacy-constraint model-specific synthetic data generation, or ensure preservation of private or otherwise sensitive underlying data.

In some embodiments, the synthetic data generated using the present technique, can be used for training, re-training, refining, and/or validating the particular machine learning models for which the data was generated.

In some embodiments, the present technique receives, as input, an initial machine learning model. In some embodiments, the present technique determines feature importance with respect to a set of features, based on the relative global and/or local importance or contribution of each feature to the task of the initial machine learning model.

In some embodiments, the present technique uses the determined feature importance values to construct a set of marginal queries which will prioritize those features with the highest importance values (which may be global and/or local importance values), when executed over an underlying database. By prioritizing features with high importance, the resulting synthetic data will reflect the statistical characteristics of the original data that are most important for the machine learning task. Moreover, the overall number of marginal queries that need to be computed over the database will decrease, which will also reduce the performance overhead, and in the case of applying differential privacy, the amount of noise that must be added to each marginal query for privacy-preserving purposes. The reduction in noise will have a compound positive effect on the overall effectiveness of the synthetic data generated, and substantially reduce the computation overhead over brute-force, nontailored solutions.

By way of background, a basic problem in differential privacy is to accurately answer a large number of statistical queries which ask how many people in a private database have a particular attribute or a combinations of attributes. The answers to the queries can be encoded in a synthetic dataset. Synthetic datasets can effectively represent the answers to large numbers of queries, and also permit one to evaluate other queries than those that have been answered over the original database. However, as noted above, answering k-way marginal queries with k values higher than 2 incurs an exponential computational overhead, as well as significantly increasing the amount of noise, in cases where noise is added to the results to satisfy privacy constraints.

Accordingly, a potential advantage of the present technique is, therefore, in that it provides for synthetic data generation for machine learning model training, in a manner that is computationally practicable. In some cases, the present technique can provide for synthetic data generation for machine learning model training in a way that preserves privacy according to mathematical guarantees, and increases utility of the resulting data.

Throughout this disclosure, the present technique may optionally apply privacy-privacy standards, to ensure that any information outputs about a private dataset do not include information about individuals in the dataset. In some embodiments, such privacy-preserving standards may be differential privacy constraints, which generally refer to any data mining algorithm, such as the present technique, is differentially-private when it is impossible to observe from its output whether a particular individual's information was used in the computation.

Reference is now made to FIG. 1, which shows a block diagram of an exemplary computing environment 100, containing an example of an environment for the execution of at least some of the computer code involved in performing the inventive methods, such as synthetic data generator 300, comprising a feature scoring module 302, a query generation module 304, a privatizer module 306, and/or machine learning module 308. In addition to block 300, computing environment 100 includes, for example, a computer 101, a wide area network (WAN) 102, an end user device (EUD) 103, a remote server 104, a public cloud 105, and/or a private cloud 106. In this example, computer 101 includes a processor set 110 (including processing circuitry 120 and a cache 121), a communication fabric 111, a volatile memory 112, a persistent storage 113 (including an operating system 122 and block 300, as identified above), a peripheral device set 114 (including a user interface (UI), a device set 123, a storage 124, and an Internet of Things (IoT) sensor set 125), and a network module 115. Remote server 104 includes a remote database 130. Public cloud 105 includes a gateway 140, a cloud orchestration module 141, a host physical machine set 142, a virtual machine set 143, and a container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network and/or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the method(s) specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 300 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 300 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as a network interrace controller (NIC), a modem, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through the hardware included in network module 115.

WAN 102 is any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The instructions of synthetic data generator 300 are now discussed with reference to the flowchart of FIG. 2A, which illustrates a method 200 for model-specific synthetic data generation from a source database, in accordance with an embodiment.

Figure 2B:
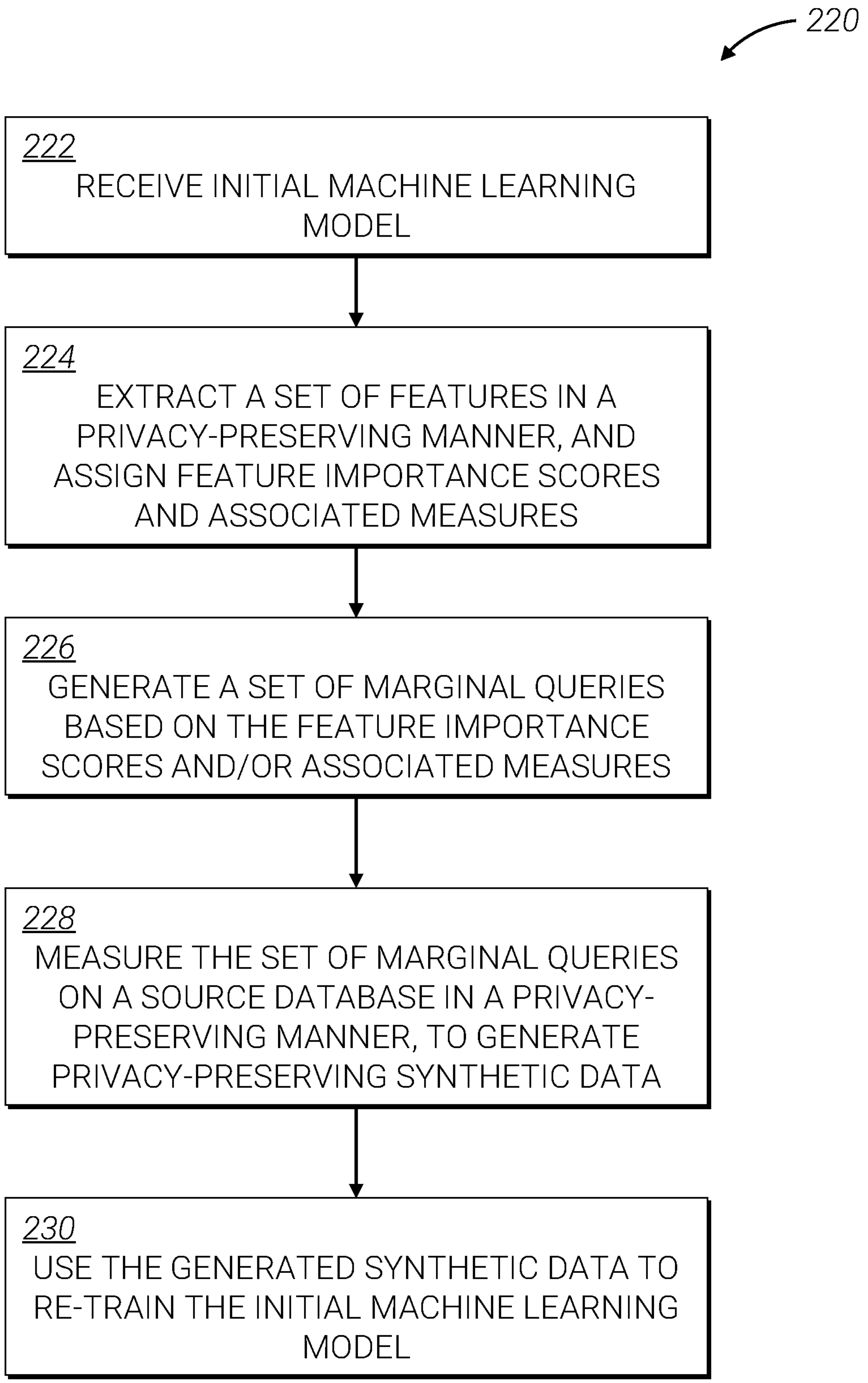
FIG. 2B is a flowchart of a method for model-specific privacy-preserving synthetic data generation from a source database comprising private data, in accordance with an embodiment.
Figure 3:
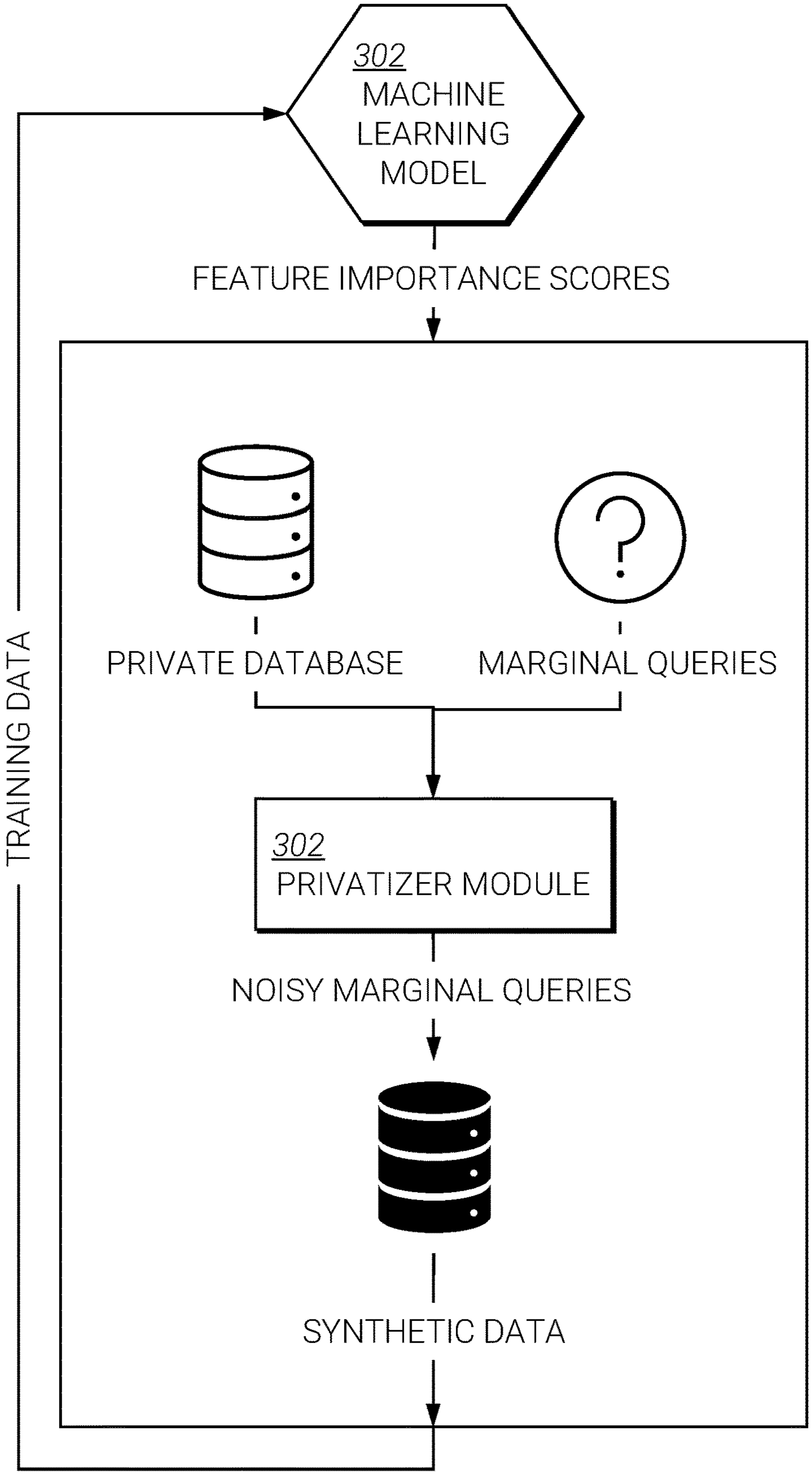
FIG. 3 is a schematic diagram of the process steps in a method for model-specific privacy-constraint synthetic data generation from a source database, according to an embodiment.

FIG. 2B illustrates a method 220, which is a variation of method 200, for model-specific privacy-preserving synthetic data generation from a source database comprising private data. FIG. 3 is a schematic diagram of the process steps in a method for model-specific privacy-constraint synthetic data generation from a private source database, according to an embodiment.

Steps of methods 200 and 220 may either be performed in the order they are presented or in a different order (or even in parallel), as briefly mentioned above, as long as the order allows for a necessary input to a certain step to be obtained from an output of an earlier step. In addition, the steps of methods 200 and 220 are performed automatically (e.g., by computer 101 of FIG. 1, or by any other applicable component of computing environment 100), unless specifically stated otherwise.

By way of overview, in some embodiments, method 200 generates meaningful k-way marginal queries, which may be executed over a source database. In method 220, the meaningful k-way marginal queries can be generated in a privacy-preserving manner, e.g., according to differential privacy constraints.

In some embodiments, the k-way marginal queries are adapted to extract information that is relevant to an initial machine learning model, based on identifying a set of features that are the most important or contributory (wherein feature importance and contribution can be global or local) to the output of the model. In some embodiments, the output results of the k-way marginal queries are used to generate synthetic data. The synthetic data generated from the k-way marginal queries is used, in turn, to re-train or refine the initial existing machine learning model, or to train a new machine learning model, to perform a specified machine learning task. In some embodiments, the initial machine learning model may be configured to perform any applicable machine learning task, such as, but not limited to, binary or multiclass classification, regression analysis, clustering. anomaly detection, ranking, and the like. The present technique may be applicable with respect to any machine learning model type, and with respect to any machine learning task, for which feature importance and contribution values can be extracted and/or determined.

Method 200 begins in step 202, wherein synthetic data generator 300 receives, as input, an initial machine learning model, as may be realized, for example, by machine learning module of synthetic data generator 300. In some embodiments, the initial machine learning model is initially-trained on the data included in a specified source database, and/or on data approximating the data included in the source database.

In the case of method 220, which begins in step 222, the source database may comprise private data.

In some embodiments, the initial machine learning model received in steps 202/222 may be configured to perform any applicable machine learning task, such as, but not limited to, binary or multiclass classification, regression analysis, clustering, anomaly detection, ranking, and the like.

In step 204 of method 200, the instructions of feature scoring module 302 may cause synthetic data generator 300 to perform a feature extraction and scoring stage with respect to the initial machine learning model.

In some embodiments, the instructions of feature scoring module 302 may cause synthetic data generator 300 to extract a set of features (i.e., variables), each representing an explanatory measurable property of the dataset used to train and inference the initial machine learning model. In some embodiments, the set of features is extracted based, at least in part, on the relative importance of each of the features in the set.

In some embodiments, the instructions of feature scoring module 302 may further cause synthetic data generator 300 to assign to each of the extracted features in the set a feature importance score, which indicates the relative explanatory or contributory power of each feature with respect to the output of the initial machine learning model. In some embodiments, feature importance scores may comprise global and/or local importance values. In some embodiments, the instructions of feature scoring module 302 may further cause synthetic data generator 300 to assign, to at least some of the features, other and/or additional measures or values, such as, but not limited to, covariance with other features and/or feature sensitivity (i.e., the relative amount of output change in response to a given change in the feature value).

In some embodiments, the feature extraction and scoring stage can be performed using any known suitable method or technique. Such a technique may use SHAP values (SHapley Additive explanations), which determine an impact of assigning a specific value to a given feature, as compared to a predetermined baseline value.

In the case of method 220, in step 224, the instructions of feature scoring module 302 may cause synthetic data generator 300 to perform a feature extraction and scoring stage with respect to the initial machine learning model received in step 222, in a privacy-preserving manner. In some embodiments, the privacy-preserving feature extraction and scoring can be made under differential privacy constraints, wherein the results of this stage are not disclosive of any underlying private data. In such cases, the present technique can employ one or more of the following methods to extract and assign scores to the set of features under privacy-preserving constraints:

- Training a surrogate initial machine learning model on public or non-private data which approximates the private source database. Then, extracting the set of features and assigning an importance score to each feature. In some embodiments, the feature extraction and scoring may be performed using, e.g., SHAP values.
- Training a surrogate differentially-private initial machine learning model on the private source database. Then, extracting the set of features and assigning an importance score to each feature. In some embodiments, feature extraction and scoring may be performed using, e.g., SHAP values. For example, such model may comprise a decision tree algorithm or locally-linear maps, which are a linear combination of multiple differentially-private logistic regression algorithms. In some embodiments, the set of features may be thus extracted directly from the differentially-private initial machine learning model.
- Training a surrogate differentially-private machine learning model on the private source database. Then, extracting the set of features and assigning an importance score to each feature (using, e.g., SHAP values), based on public or non-private test data.
- Employing differentially-private feature extraction methods, which capture the degree of influence of inputs on outputs of a system, such as those proposed by [Patel et al. 2002; Datta et al. 2016] (see, Neel Patel, et al. 2022. Model Explanations with Differential Privacy. In 2022 ACM Conference on Fairness, Accountability, and Transparency (FAccT '22), Jun. 21-24, 2022, Seoul, Republic of Korea. ACM, New York, NY, USA 10 Pages; A. Datta, et al, "Algorithmic Transparency via Quantitative Input Influence: Theory and Experiments with Learning Systems," 2016 IEEE Symposium on Security and Privacy (SP), San Jose, CA, USA, 2016,pp. 598-617, doi: 10.1109/SP.2016.42.).

With reference back to FIGS. 2A and 2B, in respective steps 206 and 226 of methods 200 and 220, the instructions of query generation module 304 may cause synthetic data generator 300 to generate a set of marginal queries, based, at least in part, on the feature importance scores (e.g., global and/or local importance scores) and/or additional measures assigned to the set of features extracted in step 204. In some embodiments, step 206 comprises a feature selection process, in which a subset of features may be selected for generating marginal queries based thereon, wherein the selection is based, at least in part, on one or more of the following parameters: global feature importance score, local feature importance score, feature covariance, and/or feature sensitivity.

In some embodiments, the instructions of query generation module 304 may cause synthetic data generator 300 to select the k features from the set of features extracted in step 204 having the highest features global importance scores, and to generate a set of marginal queries comprising all k-way marginal queries which include the k selected features.

In some embodiments, the instructions of query generation module 304 may cause synthetic data generator 300 to select a subset j of the k features having the highest features global importance scores, where j<k, and to generate a set of marginal queries comprising all k-way marginal queries which include the j selected features.

In some embodiments, a target class label associated with each database record (i.e., a target prediction associated with the database record) may be included in the selected k features, such that the generated k-way marginal queries include the target label and the k-1 features having the highest feature importance scores.

In some embodiments, feature selection may take into account feature covariance with other features. Thus, the feature selection process may select the k features based on their global and/or local importance scores, while further selecting for low covariance or correlation with other features. For example, an iterative process may be employed, wherein in each iteration, features that are highly-correlated with the previously-selected feature are removed, and the next feature is selected score from the remaining pool of non-correlated features, based on its importance score.

In other cases, k features may be sampled iteratively based on their feature importance scores (as well as potentially feature covariance and/or feature sensitivity measures), wherein feature importance scores represent feature selection probability in the sampling process. Thus, in each iteration, a next feature is selected based on the probabilities associated with the feature, wherein a feature with a higher importance score will be sampled more often than a feature with a lower feature importance score.

In some cases, marginal query generation may be based, at least in part, on local feature importance scores, such that the selection of features (and the resulting marginal queries) reflects the local effect of each feature. Accordingly, feature combinations with high local feature importance scores may be added to the list of k features which are used to generate the k-way marginal queries. Such combinations may be used, for example, for some or all 2-way marginal queries.

In some cases, feature selection for marginal query generation may be based, at least in part, on generating localized marginal queries, i.e., queries localized to specific subdomains in the data. In some embodiments, such localized feature selection may be further weighted with additional measures, e.g., feature covariance and/or feature sensitivity. This process may help to select the most meaningful marginal queries within each sub-domain, based on local feature importance scores. For example, consider a subset of database records associated with persons aged 15-20 years, wherein the two features with the highest feature importance scores is 'age,' followed by 'sex.' However, for the specific subgroup of persons aged 40-45 years, the two features with the highest feature importance scores are 'age,' followed by 'income.' Accordingly, the generated set of marginal queries may be constructed to comprise only the feature 'sex' or only the feature 'income,' depending on the age of the relevant person, as can be seen in Table 1 below.

TABLE 1

Exemplary localized feature selection

| Age | Feature 1 | Feature 2 |
|---|---|---|
| 15 | AGE | SEX |
| 15 | AGE | SEX |
| 16 | AGE | SEX |
| 20 | AGE | SEX |
| 41 | AGE | INCOME |
| 42 | AGE | INCOME |
| 44 | AGE | INCOME |

With reference back to FIG. 2A, in step 208 of method 200, the instructions of query generation module 304 may cause synthetic data generator 300 to perform a measurement process, by measuring or computing the set of marginal queries generated in step 206 over the source database. In some embodiments, the instructions of query generation module 304 may cause synthetic data generator 300 to generate synthetic data which matches, at least in part, the results of the query measurements.

With reference back to FIG. 2B, in step 228 of method 220, when the source database comprises private data, the instructions of privatizer module 306 may cause synthetic data generator 300 to perform the measuring process in a privacy-preserving manner, such as under differential-privacy constraints. For example, the instructions of privatizer module 306 may cause synthetic data generator 300 to perturb the results of the measuring of the marginal queries, e.g., by adding a noise component, such as Gaussian noise or Laplace noise, to obtain noisy measurements of the set of marginal queries generated in step 206. In some embodiments, the instructions of privatizer module 306 may then cause synthetic data generator 300 to use any suitable optimization method to search privacy-preserving (e.g. differentially-private) synthetic data that most closely matches the noisy set of query measurements on the private source database. For example, the instructions of privatizer module 306 may cause synthetic data generator 300 to employ Private-PGM (sec, e.g., Ryan McKenna and Terrance Liu. 2022. A simple recipe for private synthetic data generation. DifferentialPrivacy.org). Private-PGM receives as input a collection of noisy marginal query results of the sensitive data, and outputs a discrete data distribution that best explains the noisy measurements.

With reference back to FIG. 2A, in step 210 of method 200, the instructions of machine learning module 308 may cause synthetic data generator 300 to use the synthetic data generated in step 208 (which optionally may be privacy-preserving, e.g., differentially-private), to construct a training dataset for a machine learning model.

With reference back to FIG. 2B, in step 230 of method 220, the instructions of machine learning module 308 may cause synthetic data generator 300 to use the synthetic privacy-preserving data generated in step 208 (e.g., differentially-private data), to construct a training dataset for a machine learning model. Accordingly, the constructed synthetic data training dataset constructed in step 230 will observe privacy-preserving guarantees with respect to the underlying private source database, while retaining sufficient utility for machine learning training or validation tasks.

In some embodiments, the database constructed in steps 210 of method 200, or in step 230 of method 220, as the case may be, may be used to re-train or refine the initial machine learning module received in step 202. In other cases, the instructions of machine learning module 308 may cause synthetic data generator 300 to use the synthetic data generated in step 208 to train a new machine learning model.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In the description and claims, each of the terms "substantially." "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1. from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise." "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method of synthetic data generation in a manner that is computationally practicable by reducing a number of marginal queries that need to be computed over a source database, the computer-implemented method comprising:

receiving an initial machine learning model;

extracting a set of features associated with said machine learning model, wherein each of said extracted features is assigned a feature importance score which represents a relative explanatory power of said feature with respect to an output of said machine learning model;

generating a set of marginal queries based, at least in part, on a selected subset of said features, the selected subset of said features having a highest said feature importance score;

performing a measurement of said set of marginal queries on a source database, to obtain measurements of said set of marginal queries on said source database, the measurement of said set of marginal queries taking less processing time than a measurement of marginal queries of a full set of said features;

using said measurements to generate synthetic data that matches said measurements;

using said synthetic data to construct a training dataset; and training the initial machine learning model using said training dataset.

2. The computer-implemented method of claim 1, further comprising using said training dataset to re-train said initial machine learning model.

3. The computer-implemented method of claim 1, wherein said source database comprises private data, and wherein said measurement is a privacy-preserving measurement of said set of marginal queries on said source database comprising said private data, to obtain privacy-preserving measurements of said set of marginal queries on said source database.

4. The computer-implemented method of claim 3, wherein said privacy-preserving measurement is a differentially-private measurement.

5. The computer-implemented method of claim 2, wherein said initial machine learning model is initially-trained on private data, and wherein said extracting and said assigning are performed using a privacy-preserving feature importance extraction method.

6. The computer-implemented method of claim 5, wherein said privacy-preserving feature importance extraction method is a differentially-private feature importance extraction method.

7. The computer-implemented method of claim 1, wherein said feature importance scores comprise at least one of the following categories: global feature importance scores, and local feature importance scores.

8. The computer-implemented method of claim 1, wherein said assigning further comprises assigning, to at least some of said features, at least one of the following measures: covariance, and sensitivity.

9. The computer-implemented method of claim 1, wherein said selected subset of features comprises k features, and wherein said set of marginal queries comprises all k-way marginal queries which include said selected subset of k features.

10. A system for synthetic data generation in a manner that is computationally practicable by reducing a number of marginal queries that need to be computed over a source database, said system comprising:

at least one hardware processor; and a non-transitory computer-readable storage medium having program code embodied therewith, the program code executable by said at least one hardware processor to:

receive a an initial machine learning model, extract a set of features associated with said machine learning model, wherein each of said extracted features is assigned a feature importance score which represents a relative explanatory power of said feature with respect to an output of said machine learning model, generate a set of marginal queries based, at least in part, on a selected subset of said features, the selected subset of said features having a highest said feature importance score, perform a measurement of said set of marginal queries on a source database, to obtain measurements of said set of marginal queries on said source database, the measurement of said set of marginal queries taking less processing time than a measurement of marginal queries of a full set of said features, use said measurements to generate synthetic data that matches said measurements, and using said synthetic data to construct a training dataset, wherein said training dataset is used to re-train said received initial machine learning model.

11. The system of claim 10, wherein said source database comprises private data, and wherein said measurement is a privacy-preserving measurement of said set of marginal queries on said source database comprising said private data, to obtain privacy-preserving measurements of said set of marginal queries on said source database.

12. The system of claim 11, wherein said privacy-preserving measurement is a differentially-private measurement.

13. The system of claim 10, wherein said initial machine learning model is initially-trained on private data, and wherein said extracting and said assigning are performed using a privacy-preserving feature importance extraction method.

14. The system of claim 13, wherein said privacy-preserving feature importance extraction method is a differentially-private feature importance extraction method.

15. The system of claim 10, wherein said feature importance scores comprise at least one of the following categories: global feature importance scores, and local feature importance scores.

16. The system of claim 10, wherein said assigning further comprises assigning, to at least some of said features, at least one of the following measures: covariance, and sensitivity.

17. The system of claim 10, wherein said selected subset of features comprises k features, and wherein said set of marginal queries comprises all k-way marginal queries which include said selected subset of k features.

18. A computer program product comprising a non-transitory computer-readable storage medium having program code embodied therewith, the program code executable by at least one hardware processor to:

receive an initial machine learning model;

extract a set of features associated with said machine learning model, wherein each of said extracted features is assigned a feature importance score which represents a relative explanatory power of said feature with respect to an output of said machine learning model;

generate a set of marginal queries based, at least in part, on a selected subset of said features, the selected subset of said features having a highest said feature importance score;

perform a measurement of said set of marginal queries on a source database, to obtain measurements of said set of marginal queries on said source database, the measurement of said set of marginal queries taking less processing time than a measurement of marginal queries of a full set of said features;

use said measurements to generate synthetic data that matches said measurements;

use said synthetic data to construct a training dataset; and train the initial machine learning model using said training dataset.

19. The computer program product of claim 18, wherein said program code is further executable to use training dataset to re-train said initial machine learning model.

* * * * *